Sept. 10, 1968    R. A. HUDSON ET AL    3,400,988
UNITIZED PLASTIC WHEEL AND BEARING
Filed Feb. 6, 1967    2 Sheets-Sheet 1
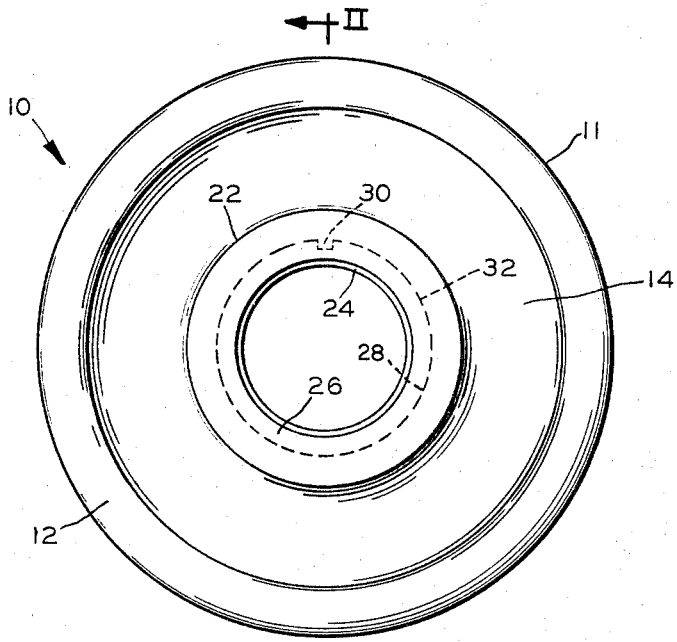
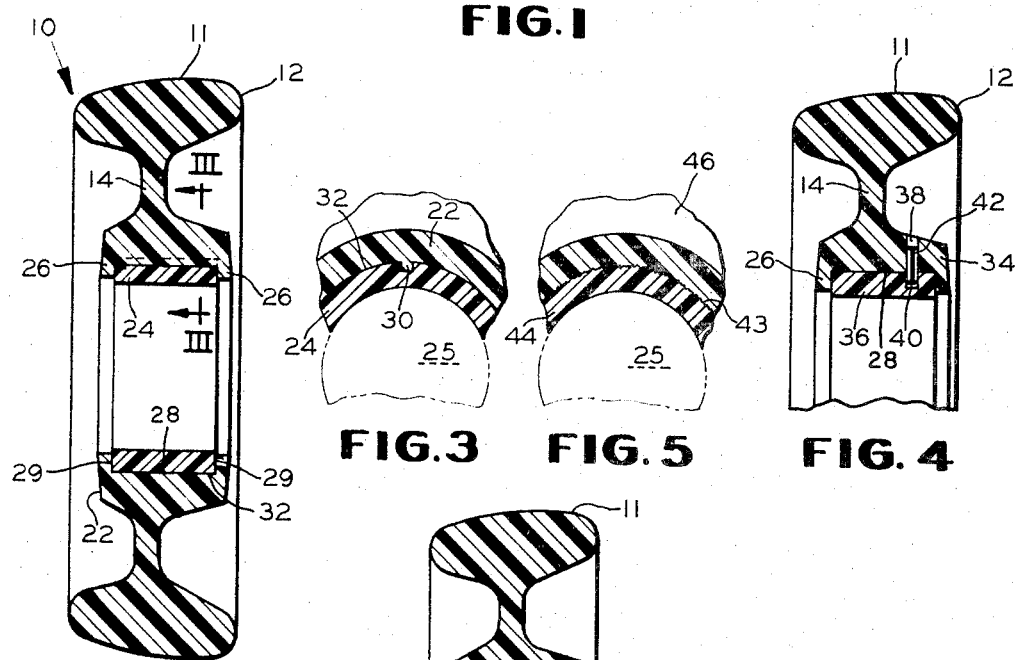
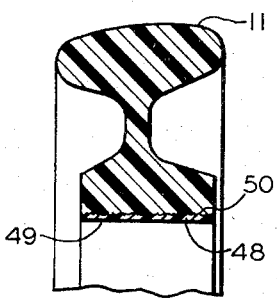
INVENTORS
RAYMOND A. HUDSON
DAVID L. WALCHLE
JAMES G. VARNEY
BY
ATTORNEY

United States Patent Office 3,400,988
Patented Sept. 10, 1968

3,400,988
UNITIZED PLASTIC WHEEL AND BEARING
Raymond A. Hudson, Albany, Ga., and David L. Walchle and James G. Varney, Milan, Mich., assignors to The Mather Company, Toledo, Ohio, a corporation of Ohio
Continuation-in-part of application Ser. No. 369,676, May 25, 1964. This application Feb. 6, 1967, Ser. No. 614,144
4 Claims. (Cl. 308—20)

ABSTRACT OF THE DISCLOSURE

A unitized plastic wheel comprising an annular sleeve bearing element of reinforced tetrafluoroethylene (TFE) having a rigid backing in the form of a wheel body capable of being molded, or formed around the bearing element in intimate and fixed contact therewith, including also flanges and/or radial means for further anchoring said sleeve to the rigid backing. The contacting surface of the tetrafluoroethylene with the rigid backing is deep etched to be sufficiently rough so that the rigid backing may be intimately molded thereinto.

Related inventions

This is a continuation-in-part application of copending application of Raymond A. Hudson and David L. Walchle Ser. No. 369,676, filed May 25, 1964, now abandoned.

Summary of the invention

This invention relates to annular means for contacting a cylindrical surface and the method for forming the same. It is particularly directed to antifriction annular contactors such as seals for bearings and the like formed of a synthetic plastic having a comparatively high processing temperature and provided with a rigid backing or housing means. More particularly it deals with a wheel with a self-contained sleeve bearing of tetrafluoroethylene which is substantially frictionless and requires little or no lubricant.

An object of this invention is to provide a bearing annulus of TFE (tetrafluoroethylene) compound integrated in a wheel body made of hard rubber, thermoplastic or thermosetting plastic or metal alloy in intimate contact with three sides of the annulus.

Another object of this invention is to provide a unitized wheel structure having an integrated TFE bearing annulus with improved load bearing and heat dissipating features.

Another object of the invention resides in the provision of a method for forming rigid backing members on preformed bearing means by molding or casting such backing members on the bearing means so that the outer periphery and parts of the adjacent sides of the bearing means are bonded or adhered to the backing member to support and retain the bearing means.

Another object of this invention is to provide a molded wheel having a TFE bearing fixedly integrated therewith by bonding and/or mechanical interlocking means.

A further object of this invention is to produce a new, durable and economical wheel with a self-contained simple, effective, efficient and long life anti-friction sleeve bearing requiring little or no lubricant.

Brief description of the drawings

The above mentioned and other features and objects of this invention and the manner of attaining them will become more apparent and the invention itself will be understood best by reference to the following description of embodiments of the invention taken in conjunction with the accompanying drawings, wherein:

FIG. 1 is an elevational view of a conveyor wheel incorporating the present invention;

FIG. 2 is a vertical sectional detail view on a line II—II of FIG. 1;

FIG. 3 is a fragmentary detail view on a line III—III of FIG. 2, also showing a part of the shaft for the wheel;

FIG. 4 is a fragmentary detail view showing a modified interlock between the bearing and hub of the wheel of FIG. 2;

FIG. 5 is a fragmentary detail view similar to that of FIG. 3 but with the bearing element etched and bonded to a wheel hub;

FIG. 6 is a fragmentary detail view similar to that of FIG. 5 but with an unrecessed bore in the wheel hub having a film-like bearing element etched and bonded thereto;

Detailed description of preferred embodiments

Figure 7:
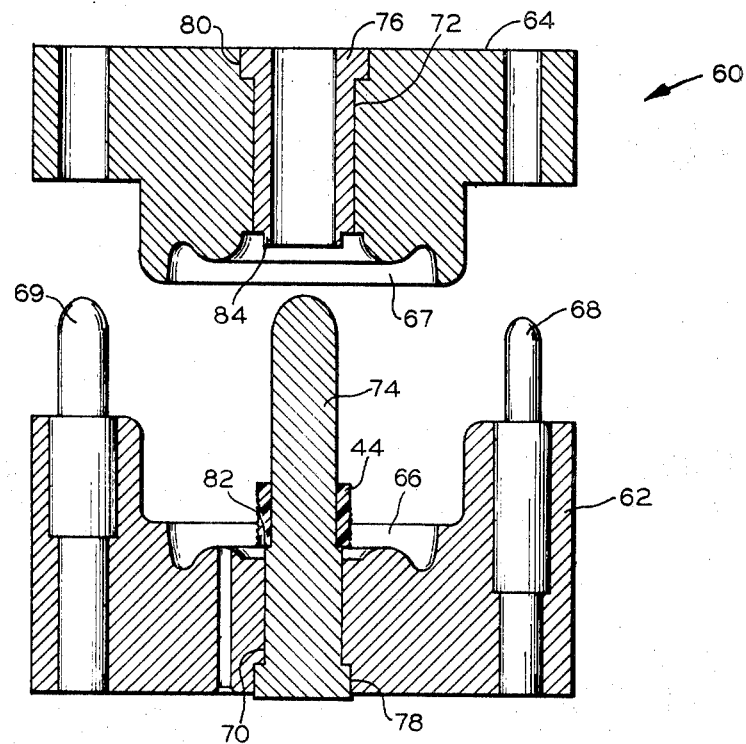
FIG. 7 is a vertical sectional view taken on an axial centerline of the wheel mold apparatus showing mold sections in a parted position with the TFE bearing sleeve in position on the core pin.
Figure 8:
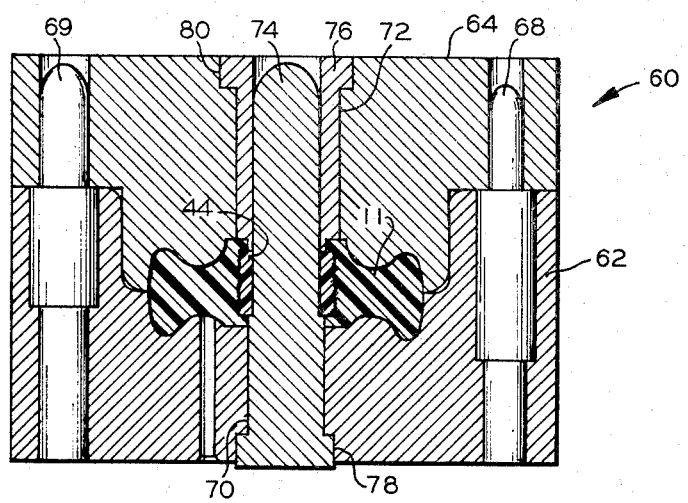
FIG. 8 is a vertical sectional view similar to FIG. 7, but with the molding compound in the mold and the mold sections in closed position.

Referring to the drawings which illustrate the invention as it is embodied in a conveyor wheel, FIGS. 1, 2 and 3 show a wheel 10 comprising a wheel body 11 having a rim portion 12 connected by a web portion 14 of reduced section to a hub portion 22 containing an integrally attached anti-friction bearing sleeve 24 in its axial bore. The wheel body 11 may be molded from a rigid plastic or metal material having a molding temperature less than the destructive temperature of the anti-friction sleeve bearing 24. The bearing element 24 is made from TFE or the like plastic material having a low coefficient of friction, which plastic may be impregnated with a reinforcing material such as bronze particles. A composite TFE material containing an amount of bronze particles equal to about 30% of its total compressed volume reduces the cold flow of the TFE and gives it improved load bearing characteristics. Also the impregnated metal serves to transfer and dissipate any heat generated at the surface of the TFE bearing element which rotatably engages the shaft 25.

The bore of the hub 22 is formed with inwardly extending radial flanges 26 at its opposite sides, the inner edges of the flanges defining an annular recess 28 in the axial bore of the hub. The flanges 26 embrace only a portion of the edges 29 of the bearing sleeve 24 and to this extent restrict the cold flow of the plastic bearing material while allowing some movement of the otherwise unconfined edges 29 of the TFE material not in contact with the flanges 26.

Normally the bearing 24 and the surrounding hub portion are bonded together by the process of molding one on the other. This bond is usually sufficient to prevent the bearing 24 from turning in the hub 22, but under certain conditions it has been found desirable to also mechanically lock the bearing in the hub 22. This may be accomplished by machining a transverse groove 30 in the bearing periphery 32 to provide a keyway which is filled with the material of the hub 22 during forming. Alternately the similar hub 34 and bearing 36 may be mechanically interlocked as in FIG. 4, providing complementary radial bores 38 and 40 for the reception of a locking pin 42.

The wheel body and bearing also may be bonded into a unitized structure by deep etching the periphery 43 of a pre-formed TFE sleeve 44 in accordance with the process described in detail in the copending application of David L. Walchle et al. Ser. No. 560,661, filed June 27, 1966, where a phenolic or the like backing or wheel body 46 is molded around the etched outside 43 of the TFE sleeve 44 (see FIGS. 5 and 6).

FIG. 6 shows a film-like or thin bearing sleeve 48 having a thickness of about 30 thousandths of an inch with its periphery 49 etched and bonded to a hub bore 50 which has no radial flanges. Due to the thinness of the TFE sleeve 48 the cold flow is reduced and the heat generated at the shaft contacting surface of the bearing is readily transferred away through the thin TFE sleeve.

A mold apparatus 60 for producing an integrated plastic wheel and bearing is shown in FIG. 7. The mold apparatus 60 has two separable complementary mold sections 62 and 64 which may contain mating mold form cavities 66 and 67, each equivalent to an annular half-section of the wheel to be produced. The mold shown is parted along the centerline of the wheel rim, but the mold may be designed to part at other than along the centerline of the rim, such as, when a wheel 10 having a slanted outer surface on its rim 12 is to be produced (see FIG. 2). To insure proper alignment and mating of the separable mold sections during the molding cycle, dowel pin means 68 and 69 are provided between the mold sections. Each mold section 62 or 64 may have an axial bore 70 or 72 for containing core pin means to locate and hold one of the TFE bearing sleeves 24, 36, 44, or 48, shown in FIGS. 1 through 6.

The core pin means may include a shouldered core pin 74 insertable in the bore 70 of first mold section 62 and capable of extending through the mold cavity and into the bore 72 of the second mold section 64 when the mold sections are pressed together. A shouldered core pin bushing 76 may be inserted in the bore 72 of the second mold section 64 for slidably engaging the entering end of core pin 74. A first or outer shoulder 78 or 80 may be provided on each core member 74 or 76 for axially locating the core members 74 and 76 with respect to the mold cavity. A second shoulder or abutment 82 or 84 located axially inward from the first shoulder 78 or 80 may be provided on each core member 74 or 76 for axially locating the preformed TFE bearing sleeve with respect to the mold cavity. For molding the wheel embodiment shown in FIGS. 1–5, in which the wheel body engages a portion of the radial edges of the TFE sleeve, the sleeve locating shoulders 82 and 84 may extend a short distance into the cavity, and the outside diameter of these shoulders 82 and 84 may be substantially less than the outside diameter of the preformed TFE sleeve 24, 36, or 44, but slightly less than the inside diameter of the TFE sleeve. The structure allows molding compound to bond to at least a portion of the radial edges of the sleeve. In producing the wheel structure with the very thin TFE sleeve bearing shown in FIG. 6, the sleeve locating shoulders 82 and 84 for the TFE sleeve may be flush with the mold cavity. The core members 74 and 76 may be removable so that alternate core members for TFE sleeves of different bore size and type may be interchanged therewith.

The appropriate core members 74 and 76 may be inserted in the bores 70 and 72 of their respective mold sections 62 and 64, and the sections may be fastened to a molding press. The preformed TFE bearing sleeve 24, 36, 44, or 48 may then be placed on the core pin 74 with one edge abutting the sleeve locating shoulder 82. Next the molding compound may be placed in the mold cavity and the mold sections 62 and 64 may be brought together under compression and heat so that the molding compound is formed into the shape of the wheel and bonded to the outer surface or surfaces of the TFE sleeve.

While there is described above the principles of this invention in connection with a specific device and method, it is to be clearly understood that this description is made only by way of example, and not as a limitation to the scope of this invention.

What is claimed is:
1. A unitized plastic wheel structure comprising:
(a) a rigid plastic one piece wheel body having
(1) a rim portion,
(2) a hub portion having a bore and inwardly extending radial flanges,
(3) a web portion of reduced section integrally connecting said hub portion to said rim portion; and
(b) a cylindrical preformed tetrafluoroethylene bearing sleeve lining said bore between said flanges and having at least the periphery of said sleeve deep etched and embedded with and bonded directly to the plastic hub portion in said bore to integrally connect said bearing sleeve directly to said hub portion.
2. A wheel structure according to claim 1 wherein the hub and bearing sleeve have a mechanical interlock to further prevent rotation of the bearing sleeve in the hub.
3. A wheel structure according to claim 1 wherein the tetrafluoroethylene bearing sleeve is reinforced with bronze particles.
4. A wheel structure according to claim 1 wherein the material thickness in the tetrafluoroethylene bearing sleeve is less than .040 of an inch and the periphery of the bearing sleeve is deep etched.

References Cited
UNITED STATES PATENTS

| | | |
|---|---|---|
| 2,728,698 | 12/1955 | Rudner. |
| 2,760,378 | 8/1956 | Van Deventer _____ 308—18 X |
| 3,056,709 | 10/1962 | Rising et al. |
| 3,198,411 | 8/1965 | Cope _____ 193—37 X |
| 3,215,477 | 11/1965 | Arthur. |
| 3,300,835 | 1/1967 | Barr _____ 193—37 X |

EVON C. BLUNK, *Primary Examiner.*

M. L. AJEMAN, *Assistant Examiner.*